(12) United States Patent
Sammartin et al.

(10) Patent No.: US 7,367,096 B2
(45) Date of Patent: May 6, 2008

(54) EQUIPMENT FOR MECHANICAL MACHINING, IN PARTICULAR FOR THE TURNING AND DRILLING OF LIGHT ALLOY WHEELS

(75) Inventors: Roberto Sammartin, Selvazzano Dentro (IT); Francesco Pieropan, Mestre (IT)

(73) Assignee: Maus S.p.A., Campodarsego (PD) (IT)

( * ) Notice: Subject to any disclaimer, the term of this patent is extended or adjusted under 35 U.S.C. 154(b) by 408 days.

(21) Appl. No.: 10/535,568

(22) PCT Filed: Nov. 21, 2002

(86) PCT No.: PCT/IT02/00741

§ 371 (c)(1),
(2), (4) Date: May 19, 2005

(87) PCT Pub. No.: WO2004/045803

PCT Pub. Date: Jun. 3, 2004

(65) Prior Publication Data

US 2006/0048359 A1    Mar. 9, 2006

(51) Int. Cl.
*B23B 39/00* (2006.01)
*B23Q 39/00* (2006.01)

(52) U.S. Cl. ............... 29/27 C; 29/33 P; 29/26 A; 901/7; 82/120; 82/152; 408/7; 414/754

(58) Field of Classification Search ........ 29/27 C, 29/33 P, 26 A, 27 A, 26 R, 563, 560, 40, 29/50; 901/6, 7; 82/117, 118, 120, 121, 82/123, 124, 125, 129, 138, 152, 159; 408/7, 408/13, 23, 24, 25, 32, 41; 414/754, 222.01, 414/222.02, 222.04, 222.13, 225.01, 226.01

See application file for complete search history.

(56) References Cited

U.S. PATENT DOCUMENTS 1,838,995 A * 12/1931 Johnson et al. .......... 408/234

(Continued)

FOREIGN PATENT DOCUMENTS

| DE | 37 22 180 | 1/1989 |
|---|---|---|
| DE | 44 41 106 | 5/1996 |
| DE | 201 18 456 | 1/2002 |
| JP | 08 174304 | 7/1996 |

OTHER PUBLICATIONS

International Search Report for PCT International Application No. PCT/IT2002/000741 mailed Dec. 18, 2003.

*Primary Examiner*—Dana Ross
(74) *Attorney, Agent, or Firm*—RatnerPrestia

(57) ABSTRACT

Equipment for mechanical machining, especially the turning and drilling of mechanical workpieces, such as light alloy wheels and the like, includes at least one turning unit with a double chuck to support the workpieces being machined and a turning head designed to work in association with one or other of the chucks alternately. At least one first workpiece loading/unloading device can be used for moving the workpieces being machined on one or other of the chucks so as to bring about loading/unloading of the workpieces from one of the chucks at the same time as mechanical machining is being carried out on the other chuck. The equipment further includes at least one drilling unit operatively associated with the turning unit and including at least one first drilling head combined with at least one corresponding first workpiece-holding device and at least one second device for loading/unloading parts to move parts being machined in the drilling unit. The first and second loading/unloading devices are further incorporated into the equipment to move the parts being machined away from and towards one or the other of the turning and drilling units so that mechanical machining in the drilling and turning unit takes place at the same time as the operations of loading and unloading workpieces onto and from the equipment.

19 Claims, 2 Drawing Sheets

U.S. PATENT DOCUMENTS 3,990,133 A * 11/1976 Schalles et al. ............. 29/27 C
4,400,859 A * 8/1983 Woythal et al. ............. 29/27 C
4,782,567 A 11/1988 Aihara et al.
4,984,351 A 1/1991 Matsuyama et al.
4,999,895 A 3/1991 Hirose et al.
5,351,376 A * 10/1994 Kitamura .................... 29/27 C
5,439,431 A * 8/1995 Hessbruggen et al. ...... 29/27 C
5,885,199 A * 3/1999 Shao .......................... 29/27 C
6,219,918 B1 * 4/2001 Wieland ...................... 29/27 C
6,298,531 B1 10/2001 Bauer et al.

* cited by examiner

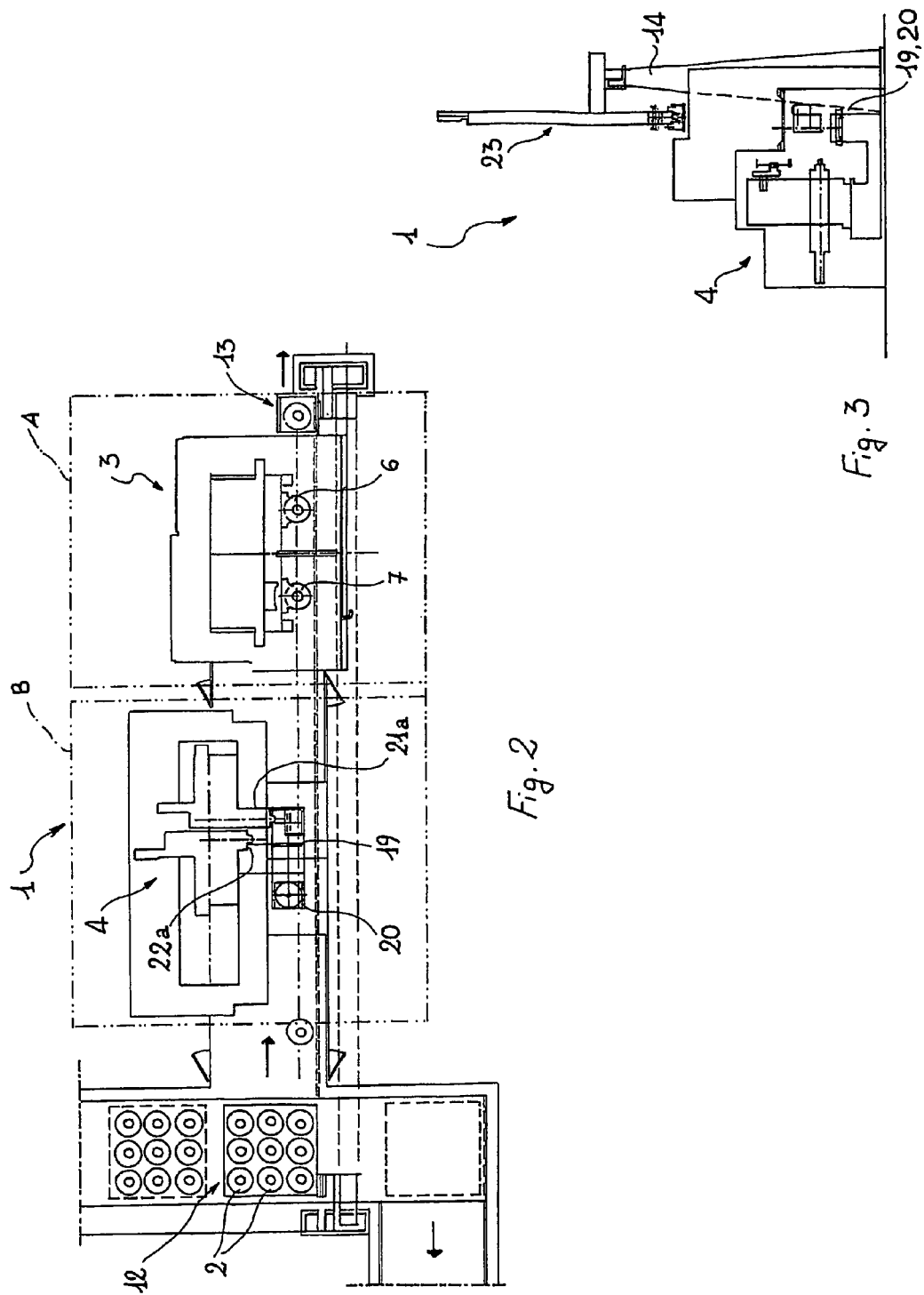

EQUIPMENT FOR MECHANICAL MACHINING, IN PARTICULAR FOR THE TURNING AND DRILLING OF LIGHT ALLOY WHEELS

This application is a U.S. National Phase Application of PCT International Application PCT/IT2002/000741.

TECHNICAL SCOPE

This invention relates to equipment for mechanical machining, and in particular for turning and drilling light alloy wheels.

TECHNICAL BACKGROUND

In the specific technical field of the manufacture of light alloy wheels, of aluminium alloy in particular, the mechanical machining which is mainly required on these metal parts comprises turning and drilling in accordance with predetermined working cycles.

These working cycles generally comprise rather short cycle times, of the order of a few minutes, in which the effect of the time during which tools are moved (otherwise known as the "changeover time") and the time for loading/unloading the workpieces is rather substantial in comparison with the actual time for which the machine tools are working in the overall cycle time. By way of example it may be noted that this may amount to even 30% and more of the machining cycle time in the case of cycle times of the order of approximately 1 minute.

It is also obvious that as the specified cycle times are reduced (as a result, for example, of reduced working times for the removal of turnings), because the changeover and loading/unloading times remain substantially unchanged this effect increases in proportion, penalizing the overall productivity of the machining equipment.

BRIEF SUMMARY OF THE INVENTION

A principal object of the invention is to provide machining equipment which has been specially designed for the drilling and turning of light alloy wheels with characteristics which drastically reduce the effect of dead times, which are understood to be the times involved in accessory operations (changeover times and workpiece loading/unloading times), during which no mechanical machining with the removal of turnings takes place, in comparison with overall cycle times, with a consequent advantageous increase in the overall productivity of the equipment.

This object and others which will appear below in the description are accomplished by equipment for mechanical machining constructed in accordance with the appended claims.

BRIEF DESCRIPTION OF THE DRAWINGS

Other advantages and characteristics of the present invention will become clear from the following detailed description which is given with reference to the appended drawings which are provided purely by way of non-limiting example and in which:

FIG. 2 is a diagrammatical view in plan of the equipment in FIG. 1, FIG. 3 is a diagrammatical side elevation view of the equipment in the preceding figures.

PREFERRED EMBODIMENT OF THE INVENTION

Figure 1:
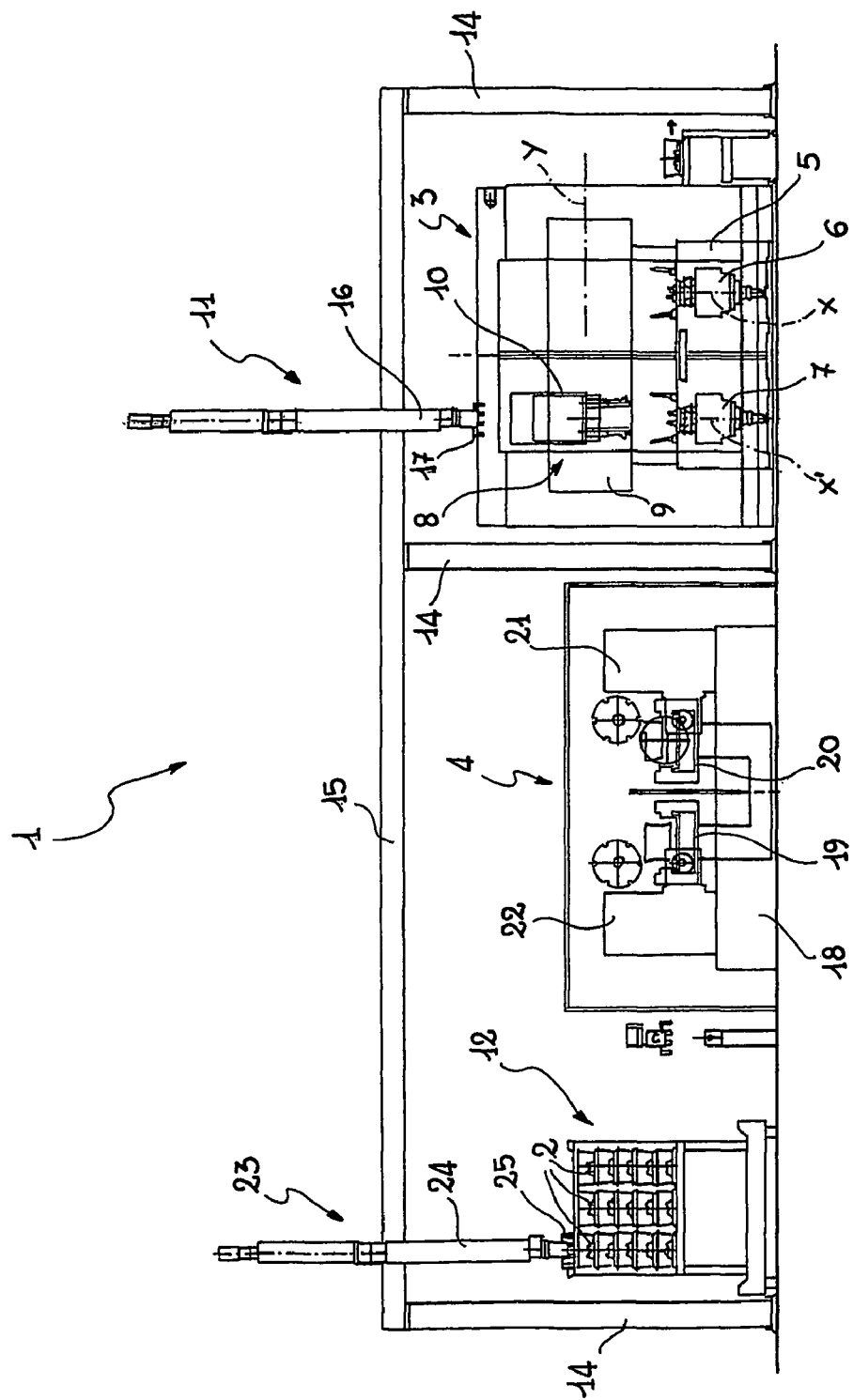
FIG. 1 is a diagrammatical front elevation view of mechanical machining equipment according to the invention.

With reference to the figures mentioned, 1 indicates as a whole mechanical machining equipment for turning and drilling wheels 2 of light alloy, especially aluminium alloy, constructed in accordance with this invention.

Equipment 1 comprises a turning unit 3 combined with a drilling unit 4, the working areas of which are indicated by A and B respectively in FIG. 2 (with a double dotted and dashed line).

Turning unit 3 comprises a base 5 on which is provided a pair of chucks 6, 7 with corresponding axes of rotation X, X' to support workpieces (wheels 2) undergoing machining and a turning head 8 designed to work in association with one or other of chucks 6, 7 alternately. More particularly, head 8 comprises an erect upright 9 from base 5 on which are provided guide and control means for a tool-holding slide 10 which can make guided movements away from and towards chucks 6, 7 along a direction parallel to an axis Y perpendicular to axes X, X' so that turning head 8 can work in the area of one or other of chucks 6, 7 alternately.

Chucks 6, 7 are also served by a single slide for rotation of the workpiece being machined. 11 indicates a first workpiece loading/unloading device, which forms part of a system for moving the workpieces and extends within working areas A and B through a magazine 12 from which wheels 2 requiring machining are taken and a station 13 for unloading machined wheels 2.

Conveniently the movement system is constructed with vertical uprights 14 which are designed to support a beam 15 lying above working units 3, 4 and incorporating guide means to guide device 11 in the corresponding working area. Beam 15 extends longitudinally between magazine 12 and unloading station 13.

Device 11 comprises an arm 16 which can move transversely in the direction of movement of the device along beam 15, approaching/moving away from chucks 6, 7 for the operations of loading/unloading wheels 2 from turning unit 3. Preferably arm 11a has a handling device 17 at one end which is designed to seize wheels 2.

Drilling unit 4, associated with working area B, is operatively associated with turning unit 3 and comprises a corresponding base 18 on which first and second workpiece-holding devices, indicated by 19 and 20 respectively, are located. Drilling unit 4 also comprise a pair of drilling heads 21, 22, each of which is provided with a corresponding tool-holding turret 21a, 22a capable of performing at least three working movements in three corresponding controlled axes and associated with a corresponding tool magazine, which is not shown. Heads 21, 22 are incorporated in drilling unit 4 so that either each can work with its corresponding workpiece-holding device or both can work on the same device in order in this second situation to carry out corresponding and separate drilling operations in one working cycle in which one head is being fitted with a tool to carry out subsequent drilling operations at the same time as the other drilling head is actively engaged in machining wheel 2.

It is also provided that drilling heads 21, 22 are further incorporated into working unit 4 so as to carry out different drilling operations in one working cycle on a wheel 2 supported in one of devices 19, 20 at the same time as the workpiece is being loaded onto/unloaded from the other device.

In this respect the equipment comprises a second workpiece loading/unloading device, indicated by 23, which is structurally and functionally identical to device 11, and correspondingly incorporates an arm 24 with a handling member 25 for grasping wheels 2. In the same way as in the case of device 11, device 23 is guided along beam 15 to move the wheels in the operations of loading/unloading from workpiece-holding devices 19, 20 and taking wheels 2 from magazine 12 and transferring them to the working area appropriate for turning operations, and vice versa.

Conveniently devices 11, 23 are incorporated into equipment 1 for moving workpieces (wheels 2) which are being machined from and towards one or other of machining units 3, 4 so that the mechanical operations of drilling and turning take place at the same time as the operations of loading/unloading from the workpiece-holding devices and the chucks, and at the same time as the stages in which the machining heads are fitted.

In operation, initially with reference to working area A in which turning is performed, it is provided that while turnings are being removed from the wheel supported in one of chucks 6, 7 a workpiece is loaded onto and unloaded from the other chuck at the same time using device 11. In this way the stages of acceleration/deceleration of one of the chucks before and after the stages of tool fitting takes place in a concealed time during which turnings are at the same time removed from the piece gripped in the other chuck. It follows that chucks 6, 7 are not therefore substantially affected by dead times, by which times are meant the times required for loading/unloading workpieces, the times for accelerating/decelerating the chuck and the times for changing tools.

Similarly, with reference to working area B where drilling is performed, drilling operations are carried out on a wheel secured on one of devices 19, 20 while a machined workpiece is at the same time loaded onto/unloaded from the other device 19, 20 using means 11, 23. Again in this case therefore dead times are concealed in that the loading/unloading and tool-fitting times for one device are at the same time effective machining time with the removal of turnings for the other device. It is provided that the drilling operations in one cycle are performed by only one of the two drilling heads or both. In the latter case, while one of heads 19, 20 performs the drilling operation, the other head is fitted with a new tool so that it can perform the next drilling operation.

When both heads 19, 20 complete the drilling operation specified in the working cycle, they are moved in the direction of the adjacent workpiece-holding device in order to carry out a further machining cycle.

It will be noted that in equipment 1 workpieces can be machined with appropriate checks first in turning unit 3 and then in drilling unit 4 or vice versa, the machining heads and the loading/unloading devices being designed to work in both ways indicated.

It will also be noted that the use of two drilling heads incorporated into machining unit 4 makes it possible to use tool-changing mechanisms of a substantially simple type with every advantage in ease of handling and control of the machining unit.

The invention thus achieves the objects specified, providing many advantages in comparison with known solutions.

Firstly, the equipment according to the invention makes possible a substantial reduction in dead times during the working cycle, in the meaning of the term indicated above, with an advantageous increase in productivity in comparison with known applications.

In particular the equipment according to the invention makes it possible to achieve a drastic reduction in the effect of loading/unloading times and the time for tool fitting and movement of the tool/workpiece-holding table within the overall cycle time so that cycle times are not governed by these accessory operations in relation to the actual time for the removal of turnings specified in the working cycle.

Furthermore, as a result of the features of the equipment according to the invention, the machine tools provided in the machining units are not subjected to machine shutdowns for operations other than actual machining operations with the removal of turnings, with a consequent maximization of productivity.

The invention claimed is:
1. Equipment for mechanical machining of workpieces, the equipment comprising:
   at least one turning unit with double chucks to support the workpieces being machined and a turning head designed to work alternately in association with one or other of the double chucks,
   at least one first workpiece loading/unloading device for moving the workpieces being machined to one or other of the double chucks so that workpieces are loaded/unloaded from one of the double chucks at the same time as mechanical machining is being performed on the other of the double chucks,
   at least one drilling unit operatively associated with the turning unit and including at least one first drilling head combined with at least one corresponding first workpiece-holding means,
   at least one second workpiece loading/unloading device for moving workpieces being machined in the at least one drilling unit,
   the first and second workpiece loading/unloading devices being further incorporated into the equipment to move the workpieces undergoing machining towards and away from one or other of the turning and drilling units so that mechanical machining in the drilling and turning units takes place at the same time as the operations of loading and unloading workpieces onto and from the equipment.

2. The equipment according to claim 1, comprising in the drilling unit at least one second drilling head and at least one second workpiece-holding means, the first and second drilling heads being incorporated into the drilling unit in such a way as to carry out corresponding separate drilling operations in one working cycle on a workpiece supported on one of the workpiece-holding means while at the same time workpiece loading/unloading movements are being performed in relation to the other workpiece-holding means.

3. The equipment according to claim 2, in which the drilling heads are equipped with corresponding tool magazines so that during stages in which machining is carried out by one of the heads the other head is at the same time being fitted with tools to carry out subsequent drilling operations.

4. The equipment according to claim 3, in which guide means are provided for at least one of the drilling heads along three corresponding controlled working axes.

5. The equipment according to claim 3, in which the at least one turning head comprises a corresponding tool-holding slide guided so as to move away from and towards the chucks for alternate machining at one or other of the chucks.

6. The equipment according to claim 3, in which the first and second workpiece loading/unloading devices are guided along the turning and drilling units between a magazine from which workpieces are picked up for machining and an opposite station for unloading workpieces machined in the equipment.

7. The equipment according to claim 2, in which guide means are provided for at least one of the drilling heads along three corresponding controlled working axes.

8. The equipment according to claim 7, in which the at least one turning head comprises a corresponding tool-holding slide guided so as to move away from and towards the chucks for alternate machining at one or other of the chucks.

9. The equipment according to claim 7, in which the first and second workpiece loading/unloading devices are guided along the turning and drilling units between a magazine from which workpieces are picked up for machining and an opposite station for unloading workpieces machined in the equipment.

10. The equipment according to claim 2, in which the at least one turning head comprises a corresponding tool-holding slide guided so as to move away from and towards the chucks for alternate machining at one or other of the chucks.

11. The equipment according to claim 2, in which the first and second workpiece loading/unloading devices are guided along the turning and drilling units between a magazine from which workpieces are picked up for machining and an opposite station for unloading workpieces machined in the equipment.

12. The equipment according to claim 1, in which the at least one turning head comprises a corresponding tool-holding slide guided so as to move away from and towards the chucks for alternate machining at one or other of the chucks.

13. The equipment according to claim 12, in which the first and second workpiece loading/unloading devices are guided along the turning and drilling units between a magazine from which workpieces are picked up for machining and an opposite station for unloading workpieces machined in the equipment.

14. The equipment according to claim 1, in which the first and second workpiece loading/unloading devices are guided along the turning and drilling units between a magazine from which workpieces are picked up for machining and an opposite station for unloading workpieces machined in the equipment.

15. The equipment according to claim 14, in which the workpiece loading/unloading devices are conducted along a guide supported by vertical uprights and lying above the turning and drilling units for moving the workpieces being machined from and towards the drilling and turning units between the magazine from which the workpieces are picked up and the station at which the workpieces are unloaded from the equipment.

16. The equipment according to claim 1, wherein the workpieces are alloy wheels.

17. Equipment for mechanical machining of workpieces, the equipment comprising:
  at least one turning unit with at least a pair of chucks to support the workpieces being machined and respective turning heads designed to work in association with the corresponding chucks,
  at least one first workpiece loading/unloading device for moving the workpieces being machined to one or other of the chucks so that workpieces are loaded/unloaded from one of the chucks at the same time as mechanical machining is being performed on the other chuck,
  at least one drilling unit operatively associated with the turning unit and including at least one first drilling head combined with at least one corresponding first workpiece-holding means,
  at least one second workpiece loading/unloading device for moving workpieces being machined in the at least one drilling unit,
  the first and second workpiece loading/unloading devices being further incorporated into the equipment to move the workpieces undergoing machining towards and away from one or the other of the turning and drilling units so that mechanical machining in the drilling and turning units takes place at the same time as the operations of loading and unloading workpieces onto and from the equipment.

18. The equipment according to claim 17, wherein the workpieces are alloy wheels.

19. Equipment for mechanical machining of workpieces, the equipment comprising:
  at least one turning unit with double chucks to support the workpieces being machined and a turning head designed to work alternately in association with one or other of the double chucks,
  at least one first workpiece loading/unloading device for moving the workpieces being machined to one or other of the double chucks so that workpieces are loaded/unloaded from one of the double chucks at the same time as mechanical machining is being performed on the other of the double chucks,
  at least one drilling unit operatively associated with the turning unit and including i) at least one first drilling head combined with at least one corresponding first workpiece-holding means and ii) at least one second drilling head and at least one second workpiece-holding means, the first and second drilling heads being incorporated into the drilling unit in such a way as to carry out corresponding separate drilling operations in one working cycle on a workpiece supported on one of the workpiece-holding means while at the same time workpiece loading/unloading movements are being performed in relation to the other workpiece-holding means,
  at least one second workpiece loading/unloading device for moving workpieces being machined in the at least one drilling unit,
  the first and second workpiece loading/unloading devices being further incorporated into the equipment to move the workpieces undergoing machining towards and away from one or other of the turning and drilling units so that mechanical machining in the drilling and turning units takes place at the same time as the operations of loading and unloading workpieces onto and from the equipment.

* * * * *

UNITED STATES PATENT AND TRADEMARK OFFICE
CERTIFICATE OF CORRECTION

PATENT NO. : 7,367,096 B2  Page 1 of 1
APPLICATION NO. : 10/535568
DATED : May 6, 2008
INVENTOR(S) : Sammartin et al.

It is certified that error appears in the above-identified patent and that said Letters Patent is hereby corrected as shown below:

On the Title Page, Item (75), Inventors: insert third inventor

-- Luigino Gianni Tommasini, Bologna (IT) --

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO.       : 7,367,096 B2                                         Page 1 of 1
APPLICATION NO.  : 10/535568
DATED            : May 6, 2008
INVENTOR(S)      : Sammartin et al.

It is certified that error appears in the above-identified patent and that said Letters Patent is hereby corrected as shown below:

On the Title Page, Item (75), Inventors: insert third inventor

-- Luigino Gianni Tommasini, Bologna (IT) --

Signed and Sealed this

Nineteenth Day of August, 2008

JON W. DUDAS
*Director of the United States Patent and Trademark Office*